Oct. 23, 1962     F. REITERER     3,059,896
VALVE ARRANGEMENTS
Filed Jan. 16, 1959     6 Sheets-Sheet 1

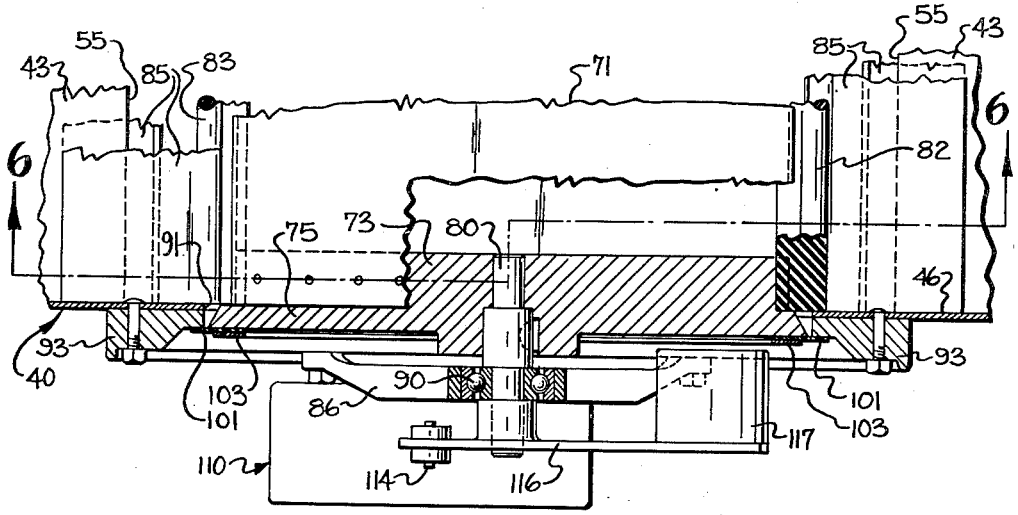
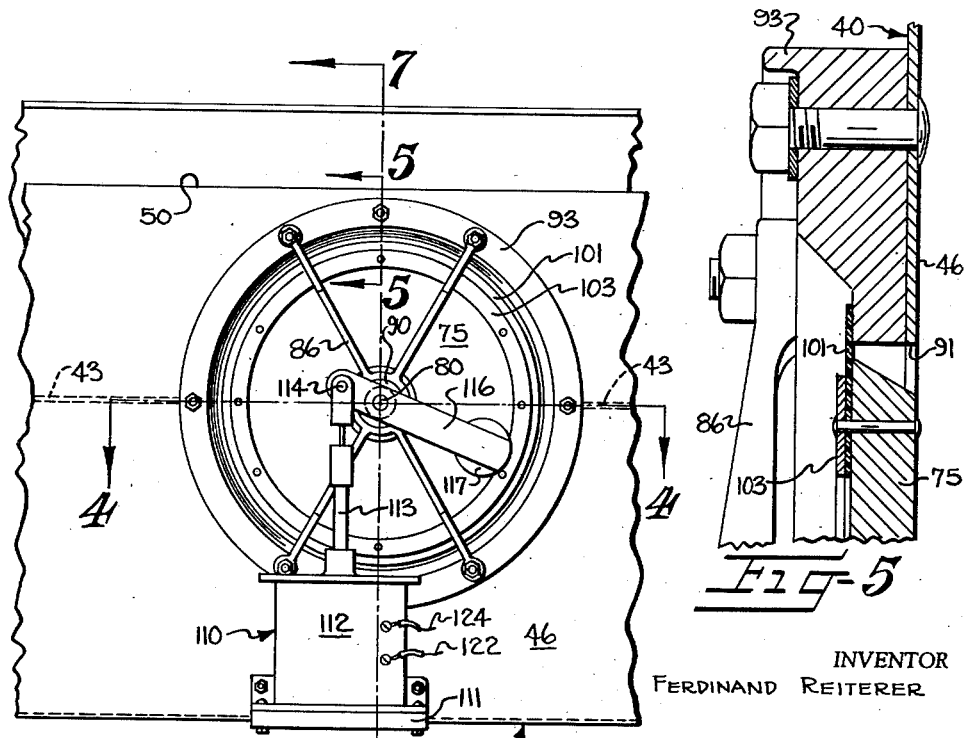

Oct. 23, 1962   F. REITERER   3,059,896
VALVE ARRANGEMENTS
Filed Jan. 16, 1959   6 Sheets-Sheet 4
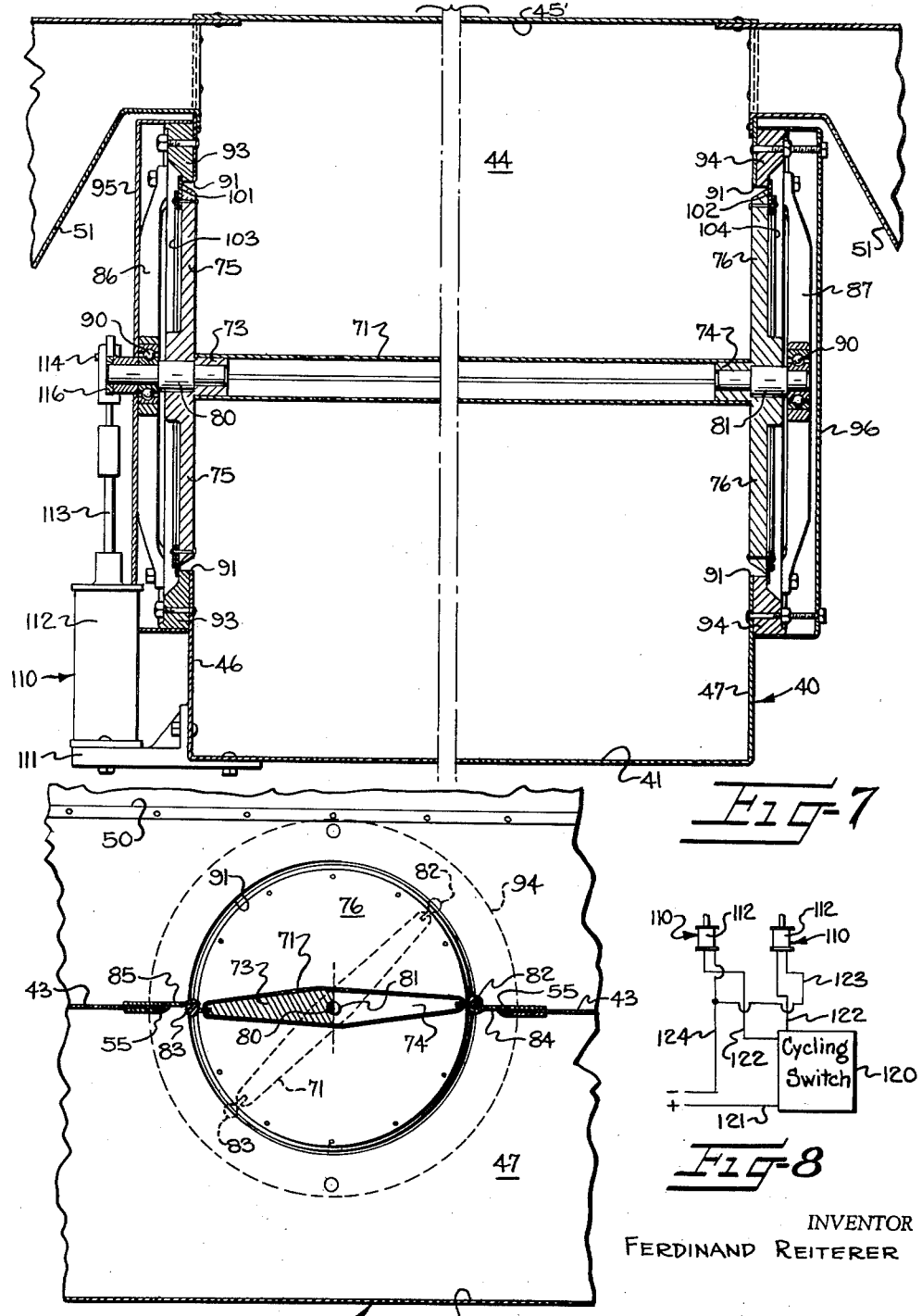
INVENTOR
FERDINAND REITERER
BY Eaton, Bell, Hunt & Seltzer
ATTORNEYS

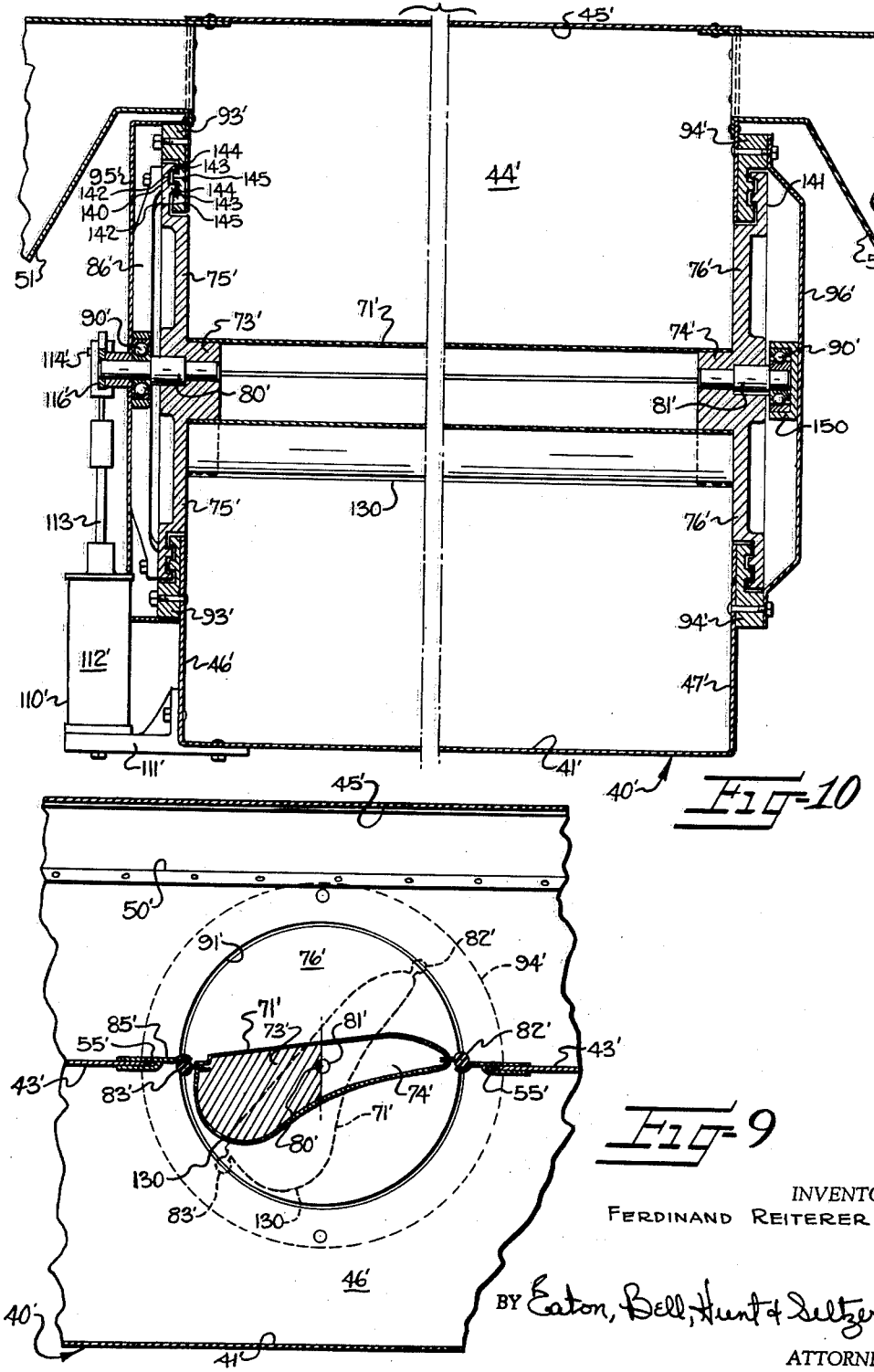

Oct. 23, 1962   F. REITERER   3,059,896
VALVE ARRANGEMENTS
Filed Jan. 16, 1959   6 Sheets-Sheet 6

INVENTOR
FERDINAND REITERER

BY Eaton, Bell, Hunt & Seltzer
ATTORNEYS

United States Patent Office 3,059,896
Patented Oct. 23, 1962

3,059,896
VALVE ARRANGEMENTS
Ferdinand Reiterer, Rueil Malmaison, France, assignor, by direct and mesne assignments, to Parks-Cramer Company, Fitchburg, Mass., a corporation of Massachusetts
Filed Jan. 16, 1959, Ser. No. 787,259
Claims priority, application France Jan. 23, 1958
8 Claims. (Cl. 251—214)

This invention generally relates to apparatus for controlling the flow of air or other gaseous fluid between divided spaces, and is particularly concerned with novel valve arrangements or assemblies which permit communication between enclosed spaces or chambers to be opened or closed, and with various applications of such valve arrangements.

It is a primary object of this invention to provide an improved valve arrangement for opening and closing an opening, port or passageway in an enclosure or chamber, which valve arrangement comprises a minimum of relatively movable elements, and insures complete fluid-tightness without friction and, consequently, without the use of a part or member which is liable to wear out, so that the seal formed between the primary movable element of the valve arrangement and the wall or walls of the passageway avoids the draw-backs of various types of stuffer boxes, retains its properties indefinitely, and may be operated with a minimum of force.

The arrangement according to the present invention comprises a shutter or butterfly member forming a valve which is adapted to pivot about a central axis extending through its plane so as to close the passageway. This arrangement is characterized by the fact that the shutter or member is sealed at opposed side edges thereof parallel to said axis and wherein two circular or annular plates, which are also provided with a peripheral seal, are attached to axially opposed ends of the shutter or member, while the closure or chamber includes two fixed plates cooperating with the seals on said movable circular plates.

Since only two opposite edges of the movable shutter are free and the other two edges are fixed to said circular plates, a rigid, strong and non-deformable assembly is thereby obtained. Furthermore, the securing of the shutter to a central axis, to the exclusion of any hinge, avoids risk of wedging and jamming and also the play which joints or articulations may suffer from, and insures reliable and durable fluid-tightness as well as sound operation.

The movable plates and the fixed plates may be in the same plane one forming an extension of the other, and need not embody unevennesses or irregularities with the result that a smooth enclosure or chamber is obtained without any part thereof to create eddies or turbulence which are liable to give rise to pressure losses and poor evacuation of dust or other light material which may be air-borne within said chamber and which may be passed through said passageway when the shutter occupies open position.

Some of the objects of the invention having been stated, other objects will appear as the description proceeds when taken in connection with the accompanying drawings, in which—

FIGURE 3 is an enlarged, fragmentary, elevation of a portion of the housing embodying the two chambers in the left-hand central portion of FIGURE 1 and showing one end of one form of the improved valve assembly;

FIGURE 4 is an enlarged, fragmentary, sectional plan view taken substantially along line 4—4 in FIGURE 3, with various elements broken away for purposes of clarity;

FIGURE 5 is an enlarged, fragmentary, vertical sectional view taken substantially along line 5—5 in FIGURE 3;

FIGURE 6 is a fragmentary vertical sectional view, on a reduced scale, taken substantially along line 6—6 in FIGURE 4;

FIGURE 7 is a longitudinal vertical sectional view through the first form of valve arrangement, this being a transverse vertical sectional view through the housing and associated elements, taken substantially along line 7—7 in FIGURE 3;

FIGURE 8 is a schematic diagram of an electrical circuit for controlling a plurality of the valve arrangements in a step-by-step manner;

FIGURE 9 is a view similar to FIGURE 6 showing a second or modified form of shutter or valve construction;

FIGURE 10 is a view similar to FIGURE 7, which not only illustrates the second form of valve construction, but also illustrates another form of seal construction between the movable circular plates and the plates carried by the enclosure or housing;

Figure 1:
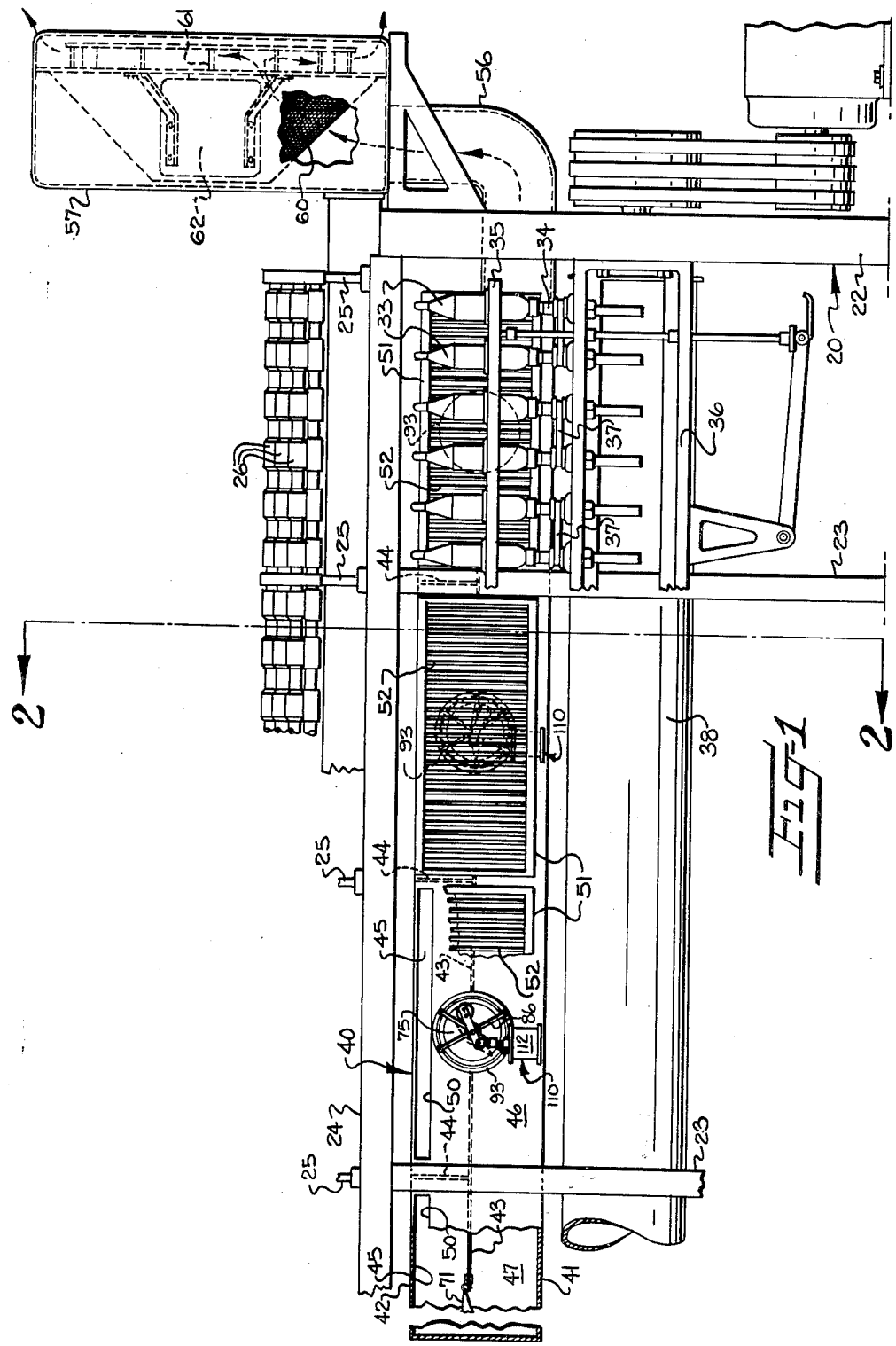
FIGURE 1 is a side elevation of substantial portions of a textile machine, such as a spinning frame, equipped with an air cleaning system and which system is equipped with the novel valve arrangements of the present invention.

Valve arrangements embodying the principles of the present invention are particularly valuable for use in association with suction cleaning systems of the character used in association with textile machinery. A preferred form of suction cleaning with which the valve arrangements of the present invention may be used is illustrated in FIGURE 1, in association with a textile machine. The textile machine is shown in the form of a spinning frame with many parts thereof being omitted or broken away for purposes of clarity.

The spinning frame or machine comprises a frame broadly designated at 20, which includes head-end and foot-end frame members 21, 22 and intermediate upright frame members or sampsons 23 which support beams 24. Beams 24 support roll stands 25 which, in turn, support the usual drafting rolls 26. Drafting rolls 26 draw roving or other textile strands 27 from yarn packages 30 carried by a creel, generally designated at 31, supported by frame 20.

As strands 27 are drafted by drafting rolls 26, they pass downwardly to and are wound about bobbins or yarn carriers 33 supported on spindles 34. The machine is equipped with a traversing ring rail 35 which carries the usual rings and travelers for laying yarn onto the bobbins 33. Spindles 34 are suitably supported by a spindle rail 36 carried by said frame 20. Spindles 34 are driven by tape members 37 which are, in turn, driven by a centrally disposed, driven, drum 38 extending longitudinally of and within the lower portion of frame 20.

The parts of the spinning frame heretofore described are conventional and are described only for environmental purposes. A novel form of suction cleaning apparatus, with which the present valve arrangements are particularly adapted to be used, is shown in association with the spinning machine. This suction cleaning apparatus comprises an elongated housing 40 in the form of two superposed longitudinal ducts 41, 42 which are separated by an elongated chamber separating member or wall 43. Elongated housing 40 includes longitudinal side walls 46, 47 which are spanned by separating wall 43.

Lower duct 41, which may also be termed as a continuous lower chamber, continues substantially throughout the length of the spinning machine. However, upper duct 42 is divided, by a plurality of transverse or lateral partitions 44, into a number of compartments or chambers 45. The outer side walls 46, 47 of that part of the housing 40 forming said upper chambers 45 are each provided with elongated passageways or air ingress openings 50 (FIGURES 1, 2, 3 and 7), there being one of said openings in each of said side walls corresponding to each chamber 45.

Figure 2:
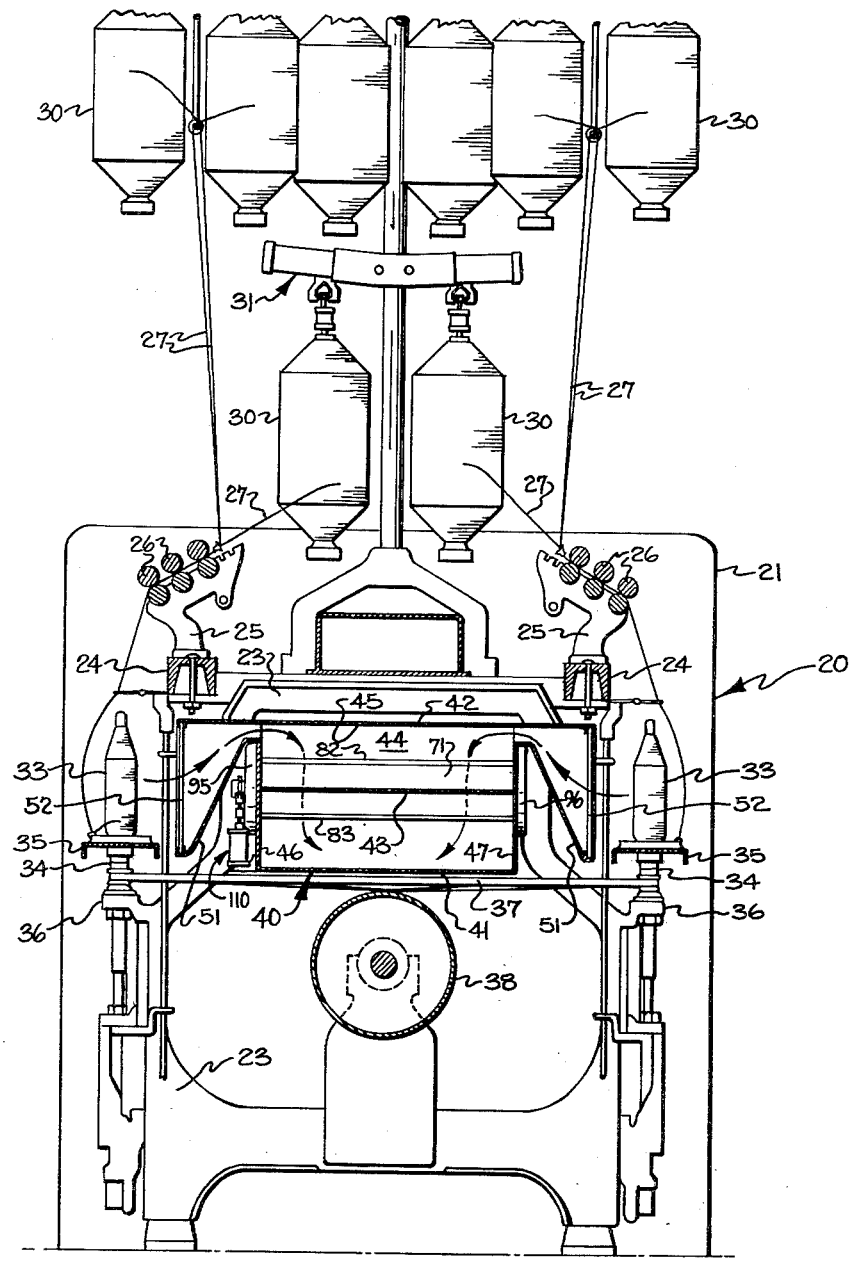
FIGURE 2 is a vertical sectional view taken substantially along line 2—2 in FIGURE 1 and also showing a creel above the machine.

It will be observed in FIGURES 1 and 2 that said openings 50 communicate with respective elongated, flared, nozzle members 51 whose outer portions are open, to the extent that they are closed by foraminated or screened wall members 52. Said foraminated or screened wall members 52 are disposed closely adjacent bobbins 33 so as to draw lint, dust and other light material, which may tend to collect on the bobbins and associated ring rails, into the nozzle members 51 and, thence, into the respective chambers 45. In order to produce suction currents in chambers 45, it will be observed that the wall member 43, separating upper chambers 45 and lower chamber 41, is provided with a plurality of passageways, openings or ports 55 therein (FIGURE 6) which extend substantially or entirely throughout the width of the dividing plate or wall 43, there being one of such openings 55 for providing communication between each upper chamber 45 and said lower chamber 41. The shutters or butterfly valves of the present invention are adapted to be installed for opening and closing said openings 55 (FIGURES 6 and 8) as will be later described.

When said shutters are closed, the air within upper chambers 45 is static. However, means are provided to produce a suction current in the lower chamber or duct 41 so as to produce suction currents in the upper chambers 45 whenever any respective valves are open. In the present instance, one end of duct 41 is provided with an elbow portion or extension 56 which is connected to the inlet side of a collector or filter box 57 of conventional or other construction. Filter box 57 contains a filter 60, which may be made from any suitable foraminated or screen material and within which a fan 61 is positioned, fan 61 being driven by a motor 62.

From the foregoing, it is apparent that fan 61 blows air through the outlet side of said filter box or collector 57, as indicated by the arrows in the upper right-hand portion of FIGURE 1 and, in so doing, fan 61 creates a suction current within bottom or lower duct 41. Thus, upon any of said openings 55 (FIGURE 6) being opened, suction currents are produced in the respective upper chambers 45 and nozzle members 51 to thereby draw lint, dust or other light material into the same and to prevent the accumulation of such light material upon the bobbins 33, spindles 34, ring rail 35 and other adjacent elements of the spinning machine. It might be stated that the particular position and area covered by the screened openings 52 is merely exemplary, since it is apparent that suction devices may be positioned adjacent the drafting rolls 26 or other elements of the machine and may be connected to the housing 40 for communication with the upper duct 42 and respective chambers 45, without departing from the spirit of the invention.

The present invention is particularly adapted for use in opening and closing, to a greater or lesser extent, openings 55 of a suction cleaning system of the character described. However, it is to be distinctly understood that the environmental use of the present invention need not be limited to the particular suction cleaning system heretofore described.

The first form of the improved valve arrangement is shown in FIGURES 1 through 7 and comprises a shutter or butterfly member 71 forming the valve proper and which may be plane or may have the form of a very elongated rhombus, or it may have an asymmetrical shape as will be more fully described hereinafter. In this instance, valve member 71 is provided with substantially flat or planar opposed surfaces thereof. Shutter 71 may rotate about a central or somewhat eccentric axis laterally or transversely of the longitudinal axis of housing 40. In this instance, shutter 71 is shown as being of hollow construction, to the extent that it may be made from a sheet material, preferably sheet metal and opposite ends of the sheet metal forming the outer walls of the shutter 71 are connected to projections or bosses 73, 74 provided on the proximal surfaces or ends of spaced, movable, circular plates, disks or wheels 75, 76.

In this instance, movable plates 75, 76 are provided with respective shafts 80, 81 which are concentric therewith and thereby form the axis of said movable circular plates 75, 76. In this instance, shafts 80, 81 are also concentric with the central axis of, and thereby form the axis of, said shutter 71.

Opposed longitudinal or side edges of shutter 71, parallel with the axis thereof carry beads or sealing elements 82, 83 which are preferably made from a flexible material, such as rubber, fabric, neoprene, plastic or the like and which, in the closed position, abut against complementary stop members 84, 85 carried by the fixed portion of the enclosure. In this instance, it will be noted in FIGURE 6 that said stop members 84, 85 are suitably secured to opposed longitudinal edge portions of the wall 43 defining the side walls of each of said openings 55.

Thus, when a shutter 71 occupies closed position, it separates the respective upper chamber 45 from said lower chamber 41. On the other hand, said chambers communicate each with the other to a greater or lesser extent in accordance with the extent to which the shutter is rotated about its axis. When shutter 71 occupies a position at right angles to that at which it is shown in FIGURES 6 and 7, for example, communication between the respective upper chamber 45 and lower chamber 41 is on a very ample or maximum basis and, by reason of the thinness of the shutter, and due to the fact that there is no internal roughness or unevenness, pressure losses and cavitations or eddies are negligible.

In order to maintain each shutter 71 in parallel relation to opposed walls of the respective opening 55 in the dividing or separating wall 43, distal ends of said shafts 80, 81 are journaled in respective frames or brackets 86, 87 preferably by respective anti-friction bearings 90 (FIGURE 7). Since movable plates 75, 76 must rotate relative to housing 45, it will be observed in FIGURES 6 and 7 that opposed side walls 46, 47 of housing 40 are each provided with a circular opening 91 which is concentric with shutter 71, and the outer surfaces of walls 46, 47 have fixed plates 93, 94 suitably secured thereto, which are preferably annular and whose inner diameters are preferably substantially the same as the diameters of, and are thereby co-extensive with, said openings 91.

The movable plates are of somewhat lesser diameter than respective openings 91, so they may move freely relative to housing side walls 46, 47 and fixed plates 93, 94 and out of contact therewith. Said fixed annular plates 93, 94 are substantially concentric with said butterfly valve or shutter 71. Thus, in this instance, each frame 86, 87 is in the form of a spider whose legs are suitably secured to said fixed plates 93, 94 (FIGURES 3, 4, 5 and 7). Movable plates 75, 76 are enclosed in protective covers 95, 96 fastened to fixed plates 93, 94.

In order to prevent flow of air through openings 91 in side walls 46 of housing 40, which would otherwise reduce the efficiency of the suction apparatus embodied in the filter box 57, thin, and preferably flat (plane), flexible gaskets or sealing elements are provided at the junctures of the movable circular plates 75, 76 and the respective fixed or stationary plates 93, 94. The gaskets 101, 102 are shown as being of annular form and are clamped, by respective rings 103, 104, to the outer faces of the respective movable plates 75, 76.

The flexible annular gaskets 101, 102 extend beyond the peripheries of the respective movable plates 75, 76 so as to be located also opposite the edges of the fixed annular plates and to thus cover the gap between the movable plates and the fixed plates. Therefore, the gaskets 101, 102 overhang the fixed plates and the reduced pressure which prevails inside the housing 40 presses the gaskets very lightly against the edges of the fixed plates, thus insuring air-tightness with negligible friction. It is apparent that the gaskets may be secured to the fixed plates 93, 94 and extend inwardly beyond the peripheries of the respective movable plates 75, 76, without departing from the spirit of the invention.

Each shutter 71 may be opened and closed by various means, such means being embodied herein in the form of electromotive means. Such electromotive means, in this instance, comprises a solenoid 110 for each valve assembly. Each solenoid 110 is suitably supported on a bracket 111 secured to the bottom portion of side wall 46 and a bottom portion of housing 40 (FIGURES 3, 4 and 7). Each solenoid 110 includes a coil 112 which encircles the lower portion of a solenoid plunger 113.

The upper end of solenoid plunger 113 is pivotally connected, as at 114, to one end of a weight or control lever 116 having a suitable weight member 117 on its end remote from plunger 113 and having a medial portion thereof fixed on the outer end of shaft 80. Weight member 117 serves as means to normally resiliently maintain the respective shutter 71 in the closed, solid-line, position shown in FIGURE 6. Accordingly, it may be stated that circular plates 93, 94 and shutter 71 are urged in one direction under torsional pressure.

The operating device embodied in solenoid 110 is shown in this form for purposes of description only, it being understood that mechanical, electromagnetic, pneumatic or hydraulic mechanisms may be used for operating the corresponding shutter 71. The valve according to the present invention therefore lends itself both to local manual control or to automatic remote control. Solenoids 110 are preferably arranged in a parallel electrical circuit to a suitable timing mechanism illustrated diagrammatically as a cycling switch 120 in FIGURE 8.

It will be observed in FIGURE 8 that cycling switch 120 is connected to one side of a suitable source of current by a conductor 121 and has a plurality of conductors 122 leading therefrom which are repeatedly energized in succession by said cycling switch 120. Each conductor 122 is connected to one side of a respective solenoid coil 112 and the other sides of the solenoid coils are connected to the other side of the source of current, as by means of conductors 123, 124. The cycling switch 120 may be of a type such as that disclosed in U.S. Patent No. 2,670,412, granted to John R. Long on February 23, 1954, for example. Accordingly, a further detailed description of the electrical circuit for controlling operation of the shutters of the valve arrangements is deemed unnecessary.

Modified Forms of Shutter and Seal

In FIGURES 9 and 10, modified forms of a shutter and sealing means between the stationary and rotary or movable plates are illustrated. In all other respects, the elements of FIGURES 9 and 10 correspond to like elements in FIGURES 1 through 7 and shall, accordingly, bear the same reference characters with the prime notation added.

It will be noted in FIGURE 6 that the first form of shutter 71 is relatively flat or plane, to the extent that it is only slightly thicker at its central portion than opposed end portions thereof. However, the second form of shutter 71' shown in FIGURE 9 is of asymmetrical cross-sectional configuration so that it resembles a teardrop or airfoil configuration, to the extent that its lower surface is provided with an involute convex or bulging portion 130 adjacent that edge thereof having the elongated seal 83' engaging the lower surface of the respective stop member 85'.

It is clear, by referring to FIGURE 6, that if, for example, the lower chamber 41 is under reduced pressure and if it is desired to open the shutter 71 by causing it to turn in a counterclockwise direction in FIGURE 6, the flow of air from the respective upper chamber 45 into lower chamber 41 and toward the collector or filter box 57 (right to left in FIGURE 6) causes pressure on the lower surface of the shutter 71', thus substantially braking its opening movement.

It will be noted that the enlarged or bulging portion 130 on the lower surface of shutter 71' (FIGURE 9) causes the air set in motion, with the start of the opening of the shutter, to be distributed over a relatively large area and, as a result, the enlarged portion 130 reduces pressure on the lower surface of the valve or shutter 71', thus facilitating the opening movement of the valve and also permitting the use of a reduced operating force.

The shutter shaped in the manner of shutter 71' may be constructed in any manner. It may be solid or hollow and, in the latter case, consists, for example, of shaped side pieces between which there is disposed a number of spars or longitudinal members, a thin plate member, or other surface adapted to conform to the profile of the side pieces. Either form of shutter according to the present invention may be constructed of any material, such as plastic, sheet metal and the like.

In FIGURE 10, it will be noted that the seal is constructed different from the seal shown in FIGURE 7, the seal construction of FIGURE 10 being characterized by the fact that the flexible annular gasket, such as 101, 102 of FIGURE 7, is eliminated and the inner or circular movable plates 75', 76' are provided with respective relatively thin enlarged annular portions 140, 141 which overlap the outer or fixed plates 93', 94'. Said overlapping portions have complementary sealing grooves and notches therein. In other words, the movable plates are each provided with one or more concentric grooves 142 which form annular projections 143. The fixed plates 93', 94' each has concentric grooves 144 therein defining annular projections 145. Projections 143 on movable plates 75', 76' fit loosely in the grooves 145 in the fixed plates, thus forming an absolutely fluid-tight and frictionless labyrinth seal.

In this instance, it will be observed that the spider-like bracket for bearing 90' is omitted in the right-hand portion of FIGURE 10 and, instead, bearing 90' is mounted in a block 150 suitably secured to the inner surface of the corresponding protective casing or cover 96'.

From the foregoing, it is apparent that the present invention lends itself especially well to the production of intermittent and stepwise suction exerted on various machines or machine parts. There is a continuous suction in the lower duct or chamber 41, but it is possible to open the successive valve arrangements in a step-by-step manner by means of any simple system, as exemplified in FIGURE 8, so as to obtain a suction successively in the various compartments 45 of the upper duct 42. Such a system is very flexible and lends itself to staggering or stepwise performance of the suction, as desired.

The installation heretofore described utilizes a fluid under reduced or negative pressure. However, it could be used equally well with a fluid under excess or positive pressure.

Figure 11:
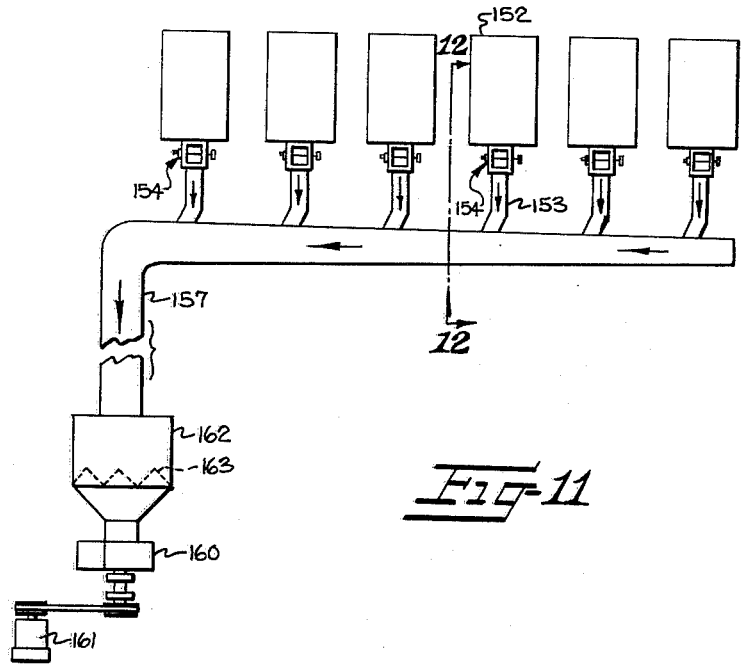
FIGURE 11 is a schematic plan view of a pneumatic conveying system for carding machines, for example, embodying another application of our improved valve arrangements.
Figure 12:
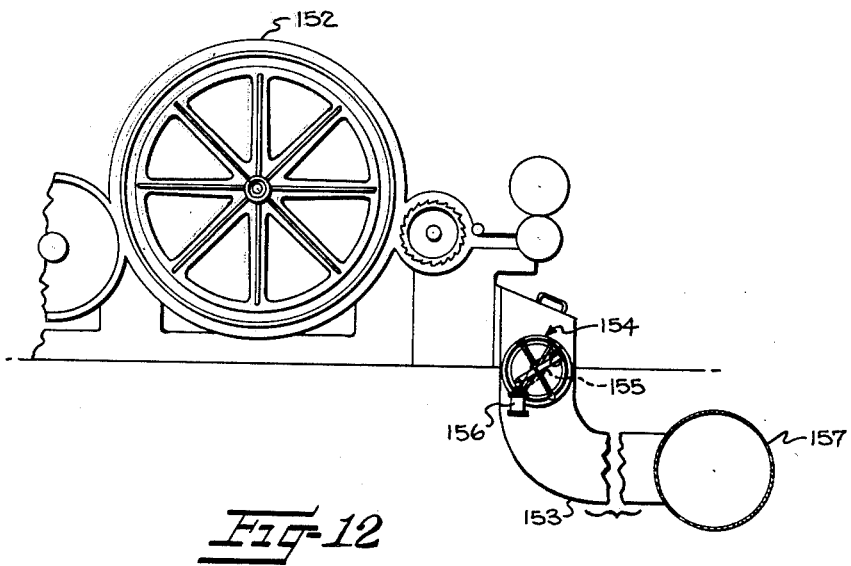
FIGURE 12 is an enlarged fragmentary view taken along line 12—12 of FIGURE 11.

Present valve assemblies cannot only be applied to a dust removing system of the character heretofore described, but can also be used for pneumatic conveyance. FIGURES 11 and 12 show an example of a pneumatic conveyance to which the improved valve is applied. In this instance, the pneumatic conveyance is shown in the form of a conveying installation in a carding room; for example, a cotton carding room. The problem is to convey the waste originated in a certain number of carding machines into a common recovery box. To this end, various carding machines, such as 152, are each provided with a separate suction duct 153 in which there is mounted a valve assembly broadly designated at 154. Valve assemblies 154 may be identical to either of the forms of the valve arrangements or assemblies shown in FIGURES 1 through 7 or FIGURES 9 and 10. Accordingly, a detailed description thereof is deemed unnecessary, it being deemed sufficient to state that valve assembly 154 includes a movable valve 155 which is controlled, for example, by an electromagnet or solenoid 156.

Below each valve assembly 154, the ducts 153 are communicatively connected to a common duct 157 in which a continuous suction is maintained by a fan or exhaust blower 160 driven by a motor 161. A recovery box or bin 162, equipped with a filter 163, is interposed in the path of the collector or duct 157 in front of the fan or exhaust blower 160. The suction and collecting means embodied in elements 160, 162, 163 of FIGURE 11 may be of substantially the same construction as corresponding elements associated with the filter box 57 in FIGURE 1 and, accordingly, a detailed illustration and description thereof is deemed unnecessary.

By supplying the solenoids of the various valve assemblies 154 with electric current step-by-step means, such as the cycling device 120 of FIGURE 8, it is possible to suck up the waste from the various carding machines in succession and to collect it all in the common bin 162, while using only a relatively low degree of suction.

In the drawings and specification there have been set forth preferred embodiments of the invention and, although specific terms are employed, they are used in a generic and descriptive sense only and not for purposes of limitation, the scope of the invention being defined in the claims.

I claim:
1. A valve arrangement for controlling air flow in an enclosure having opposed sidewalls forming a passageway therebetween, said valve arrangement comprising a pair of axially spaced circular plates having outer peripheral surfaces thereon, means supporting said circular plates for rotation thereon, a valve member connected to and extending between said circular plates in alinement with said passageway, fixed plates carried by said opposed side walls, each of said fixed plates having a circular opening therein forming an inner peripheral surface of greater diameter than said outer peripheral surfaces and within which the respective circular plates are positioned, said circular and fixed plates defining a gap therebetween, and sealing means carried by each circular plate and overlapping the respective fixed plate and bridging the gap between each circular plate and the respective fixed plate for preventing leakage between said peripheral surfaces of said circular and fixed plates, whereby said circular plates may be rotated in either direction relative to the fixed plates without contacting the fixed plates for opening and closing said valve member with respect to said passageway.

2. A structure according to claim 1 in which each of said sealing means comprises a flexible annular gasket carried by a respective circular plate and extending beyond the latter plate so as to engage the respective fixed plate and thereby close the gap between each circular plate and its respective fixed plate.

3. A valve arrangement for controlling air flow in an enclosure having a passageway therein and including a valve member adapted to open and close said passageway, means supporting at least one end of said valve member comprising a shaft extending outwardly from said end of said valve member, means rotatably supporting an outer portion of said shaft, a circular movable plate fixed on said shaft and being connected to said end of said valve member, a fixed plate carried by said enclosure and having an opening therein forming an inner peripheral surface loosely encircling the periphery of said movable plate and forming a gap between the plates to permit rotation of the movable plate without said movable plate contacting said fixed plate, and sealing means carried by one of said plates, overlapping the other plate and bridging the gap between said plates for preventing passage of air between said movable plate and said fixed plate.

4. A structure according to claim 3 in which said sealing means comprises a flat flexible annular gasket disposed on the outer face of said one of said plates and extending beyond the peripheries of the two plates so as to be located opposite the gap between the two plates thereby permitting relatively free rotational movement of said movable plate relative to said fixed plate for opening and closing said valve member relative to said passageway.

5. A valve arrangement for controlling air flow in an enclosure having opposed side walls forming a passageway therebetween, said valve arrangement comprising at least one circular plate having an outer peripheral surface thereon, means supporting said circular plate for rotation thereon, a valve member mounted for rotation with said circular plate and extending into said enclosure in alinement with said passageway, at least one of said side walls having a circular opening therein forming an inner peripheral surface of greater diameter than said outer peripheral surface and within which the circular plate is positioned, said circular plate and said one of the side walls defining a gap therebetween, and sealing means carried by the circular plate and overlapping and bridging the gap between the circular plate and said one of the side walls for preventing leakage between said peripheral surfaces of said circular plate and said one of the side walls whereby said circular plate may be rotated in either direction relative to said one of the side walls without contacting the same for opening and closing said valve member with respect to said passageway.

6. A structure according to claim 5 in which said sealing means comprises a flexible annular gasket carried by said circular plate and extending beyond the latter plate so as to close the gap between said one of the side walls and said circular plate.

7. A valve arrangement for controlling air flow in an enclosure having opposed side walls forming a passageway therebetween, said valve arrangement comprising at least one circular plate having an outer peripheral surface thereon, means supporting said circular plate for rotation thereon, a valve member mounted for rotation with said circular plate and extending into said enclosure in alinement with said passageway, a fixed plate carried by one of said opposed side walls, said fixed plate having a circular opening therein forming an inner peripheral surface of greater diameter than said outer peripheral surface and within which said circular plate is positioned, said circular and fixed plates defining a gap therebetween, and sealing means carried by at least one of said plates and overlapping the other of said plates and bridging the gap between said circular plate and said fixed plate for preventing leakage between said peripheral surfaces of said circular and fixed plates whereby said circular plate may be rotated in either direction relative to the fixed plate without contacting the fixed plate for opening and closing said valve member with respect to said passageway.

8. A structure according to claim 7 in which said sealing means comprises an annular peripheral portion on said circular plate and extending in overlapping relation to at least a portion of said fixed plate, at least one of said portions having at least one annular groove therein and the other of said portions having an annular projection thereon loosely fitting within the annular groove in said one of said portions.

References Cited in the file of this patent

UNITED STATES PATENTS

| | | |
|---|---|---|
| 750,766 | Hibbard | Jan. 26, 1904 |
| 1,587,080 | Marcelli | June 1, 1926 |
| 1,682,075 | Foulds | Aug. 28, 1928 |
| 1,767,869 | Baumgarten | June 24, 1930 |
| 2,702,868 | Kindig | Feb. 22, 1955 |
| 2,930,574 | Sebardt | Mar. 29, 1960 |

FOREIGN PATENTS

| | | |
|---|---|---|
| 6,325 | Great Britain | 1912 |